(12) United States Patent
Tsukahara et al.

(10) Patent No.: US 11,123,961 B2
(45) Date of Patent: Sep. 21, 2021

(54) PRECURSOR FILM, SUBSTRATE WITH PLATED LAYER, CONDUCTIVE FILM, TOUCH PANEL SENSOR, TOUCH PANEL, METHOD FOR PRODUCING CONDUCTIVE FILM, AND COMPOSITION FOR FORMING PLATED LAYER

(71) Applicant: FUJIFILM Corporation, Tokyo (JP)

(72) Inventors: Jiro Tsukahara, Kanagawa (JP); Takeshi Narita, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/031,697

(22) Filed: Sep. 24, 2020

(65) Prior Publication Data

US 2021/0008841 A1 Jan. 14, 2021

Related U.S. Application Data

(63) Continuation of application No. PCT/JP2019/004806, filed on Feb. 12, 2019.

(30) Foreign Application Priority Data

Mar. 26, 2018 (JP) ............................ JP2018-058710

(51) Int. Cl.
*B32B 17/10* (2006.01)
*B32B 27/36* (2006.01)
(Continued)

(52) U.S. Cl.
CPC ........... *B32B 17/10* (2013.01); *B01J 31/0205* (2013.01); *B32B 27/36* (2013.01); *G02B 1/16* (2015.01);
(Continued)

(58) Field of Classification Search
None
See application file for complete search history.

(56) References Cited

U.S. PATENT DOCUMENTS 5,892,110 A * 4/1999 Ramprasad ............. C07C 51/56
562/891
2009/0202850 A1 8/2009 Mori et al.
(Continued)

FOREIGN PATENT DOCUMENTS

WO 2008001611 A1 1/2008
WO 2016035896 A1 3/2016
(Continued)

OTHER PUBLICATIONS

International Search Report issued in PCT/JP2019/004806; dated May 21, 2019.
(Continued)

*Primary Examiner* — Duane N Taylor, Jr.
(74) *Attorney, Agent, or Firm* — Studebaker & Brackett PC

(57) ABSTRACT

The present invention provides a precursor film for producing a conductive film, the precursor film including: a substrate; a primer layer disposed on the substrate; and a plated layer precursor layer disposed on the primer layer, in which the plated layer precursor layer includes a bifunctional radical-polymerizable monomer and a polymer having a functional group which interacts with a plating catalyst or a precursor of the plating catalyst, and the bifunctional radical-polymerizable monomer has 25 to 100 atoms in a main chain of a linking chain which links two radical-polymerizable groups.

23 Claims, 1 Drawing Sheet

(51) Int. Cl.
    *G02B 1/16* (2015.01)
    *G06F 3/044* (2006.01)
    *B01J 31/02* (2006.01)
(52) U.S. Cl.
    CPC .. *G06F 3/0443* (2019.05); *G06F 2203/04103* (2013.01)

(56) References Cited

U.S. PATENT DOCUMENTS

| | | | |
|---|---|---|---|
| 2014/0146285 A1* | 5/2014 | Otani | C08F 2/46 351/159.61 |
| 2016/0175800 A1* | 6/2016 | Murphy | G01N 33/5064 506/9 |
| 2017/0081449 A1* | 3/2017 | Torkelson | C08J 11/06 |
| 2017/0260400 A1 | 9/2017 | Morimoto et al. | |
| 2018/0371619 A1 | 12/2018 | Tsukamoto | |
| 2019/0001645 A1 | 1/2019 | Narita | |

FOREIGN PATENT DOCUMENTS

| | | |
|---|---|---|
| WO | 2017154896 A1 | 9/2017 |
| WO | 2017163830 A1 | 9/2017 |
| WO | 2018034291 A1 | 2/2018 |

OTHER PUBLICATIONS

International Preliminary Report on Patentability and Written Opinion issued in PCT/JP2019/004806; dated Sep. 29, 2020.

* cited by examiner

PRECURSOR FILM, SUBSTRATE WITH PLATED LAYER, CONDUCTIVE FILM, TOUCH PANEL SENSOR, TOUCH PANEL, METHOD FOR PRODUCING CONDUCTIVE FILM, AND COMPOSITION FOR FORMING PLATED LAYER

CROSS-REFERENCE TO RELATED APPLICATIONS

This application is a Continuation of PCT International Application No. PCT/JP2019/004806 filed on Feb. 12, 2019, which claims priority under 35 U.S.C. § 119(a) to Japanese Patent Application No. 2018-058710 filed on Mar. 26, 2018. Each of the above applications is hereby expressly incorporated by reference, in its entirety, into the present application.

BACKGROUND OF THE INVENTION

1. Field of the Invention

The present invention relates to a precursor film, a substrate with a plated layer, a conductive film, a touch panel sensor, a touch panel, a method for producing a conductive film, and a composition for forming a plated layer.

2. Description of the Related Art

A conductive film (substrate with a metal layer) in which a metal layer (preferably a patterned metal layer) is disposed on a substrate is used for various applications. For example, in recent years, with an increase in mounting rate of a touch panel on a mobile phone, a portable game device, or the like, a demand for a conductive film used for an electrostatic capacitance touch sensor capable of performing multi-point detection has been rapidly increased.

Various methods for producing a conductive film have been proposed.

For example, WO2018/034291A discloses a substrate with a plated layer including a substrate, and a plated layer disposed on the substrate, in which the plated layer is obtained by curing a composition for forming a plated layer, the composition including an amide compound selected from the group consisting of a polyfunctional acrylamide having a polyoxyalkylene group and a polyfunctional methacrylamide having a polyoxyalkylene group, and a polymer having a functional group which interacts with a plating catalyst or a precursor of the plating catalyst (claims 1, 7, and 8); and a conductive film including the substrate with the plated layer, and a metal layer disposed on the plated layer of the substrate with the plated layer (claim 11).

SUMMARY OF THE INVENTION

On the other hand, recently, a conductive film having a three-dimensional shape has been demanded.

For example, in order to improve operability, a touch panel in which a touch surface has a three-dimensional shape such as a curved surface has been demanded, and the conductive film having a three-dimensional shape is used for a touch panel sensor included in such a touch panel.

Furthermore, as a substrate of the conductive film, there has been a demand for molding a film which is formed of a material having a lower glass transition temperature than materials in the related art, such as a polyethylene terephthalate film, a polypropylene film, and the like, into a three-dimensional shape at a temperature lower than the molding temperature in the related art.

The present inventors have been attempted to produce a conductive film having a three-dimensional shape by the molding using the substrate with a plated layer disclosed in WO2018/034291A at a temperature lower than the temperature in the related art. However, stretchability of the plated layer is not sufficient, and it is difficult to deform the plated layer into a desired shape.

In view of the above-described circumstances, an object of the present invention is to provide a precursor film for producing a conductive film, in which stretchability of a plated layer obtained by curing a plated layer precursor layer is excellent even in a case of the molding at a temperature lower than the temperature in the related art.

Another object of the present invention is to provide a substrate with a plated layer, a conductive film, a touch panel sensor, a touch panel, a method for producing a conductive film, and a composition for forming a plated layer.

As a result of extensive studies on the above-described problems, the present inventors have found that the above-described problems can be solved by using a bifunctional radical-polymerizable monomer having a specific linking chain length, and a polymer having a functional group which interacts with a plating catalyst or a precursor of the plating catalyst.

That is, the present inventors have found that the above-described problems can be solved by the following configurations.

[1] A precursor film for producing a conductive film, the precursor film comprising:
a substrate;
a primer layer disposed on the substrate; and
a plated layer precursor layer disposed on the primer layer,
in which the plated layer precursor layer includes a bifunctional radical-polymerizable monomer and a polymer having a functional group which interacts with a plating catalyst or a precursor of the plating catalyst, and
the bifunctional radical-polymerizable monomer has 25 to 100 atoms in a main chain of a linking chain which links two radical-polymerizable groups.

[2] The precursor film according to [1],
in which the radical-polymerizable group of the bifunctional radical-polymerizable monomer is a group selected from the group consisting of an acryloyloxy group, a methacryloyloxy group, an acrylamide group, and a methacrylamide group.

[3] The precursor film according to [1] or [2],
in which the bifunctional radical-polymerizable monomer has a polyoxyalkylene group.

[4] The precursor film according to any one of [1] to [3],
in which the bifunctional radical-polymerizable monomer is a compound represented by Formula (100).

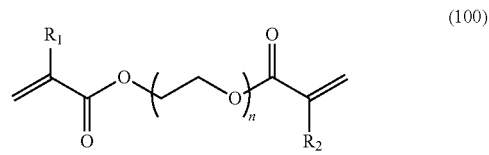

here, in Formula (100), $R_1$ and $R_2$ each independently represent a hydrogen atom or a methyl group, and n represents an integer of 9 to 33.

[5] The precursor film according to any one of [1] to [4],
in which the polymer having a functional group which interacts with a plating catalyst or a precursor of the plating catalyst is a polymer having a repeating unit derived from a conjugated diene compound, and a repeating unit derived from an unsaturated carboxylic acid or a derivative of the unsaturated carboxylic acid.

[6] The precursor film according to any one of [1] to [5],
in which the polymer having a functional group which interacts with a plating catalyst or a precursor of the plating catalyst is a butadiene-maleic acid copolymer.

[7] The precursor film according to any one of [1] to [6],
in which a glass transition temperature of the substrate is 100° C. or lower.

[8] The precursor film according to any one of [1] to [7],
in which the substrate is any one kind selected from the group consisting of a polypropylene-based resin substrate, a polymethyl methacrylate-based resin substrate, and a polyethylene terephthalate-based resin substrate.

[9] A substrate with a plated layer comprising:
a plated layer obtained by curing the plated layer precursor layer in the precursor film according to any one of [1] to [8].

[10] The substrate with a plated layer according to [9],
in which the plated layer is disposed in a pattern shape.

[11] The substrate with a plated layer according to [9] or [10],
in which the substrate has a three-dimensional shape.

[12] A conductive film comprising:
the substrate with a plated layer according to any one of [9] to [11]; and
a metal layer disposed on the plated layer in the substrate with a plated layer.

[13] A touch panel sensor comprising:
the conductive film according to [12].

[14] A touch panel comprising:
the touch panel sensor according to [13].

[15] A method for producing a conductive film, the method comprising:
an exposing step of exposing the precursor film according to any one of [1] to [8] to light;
a developing step of developing the exposed film;
a molding step of heat-molding the developed film; and
a plating step of plating the molded film.

[16] The method for producing a conductive film according to [15],
in which, in the molding step, the heat molding is performed at 60° C. to 120° C.

[17] The method for producing a conductive film according to [15] or [16],
in which, in the developing step, the exposed precursor film is washed with an alkaline aqueous solution and then washed with water.

[18] A composition for forming a plated layer, the composition comprising:
a bifunctional radical-polymerizable monomer; and
a polymer having a functional group which interacts with a plating catalyst or a precursor of the plating catalyst,
in which the bifunctional radical-polymerizable monomer has 25 to 100 atoms in a main chain of a linking chain which links two radical-polymerizable groups.

[19] The composition for forming a plated layer according to [18],
in which the radical-polymerizable group of the bifunctional radical-polymerizable monomer a group is selected from the group consisting of an acryloyloxy group, a methacryloyloxy group, an acrylamide group, and a methacrylamide group.

[20] The composition for forming a plated layer according to [18] or [19],
in which the bifunctional radical-polymerizable monomer has a polyoxyalkylene group.

[21] The composition for forming a plated layer according to any one of [18] to [20],
in which the bifunctional radical-polymerizable monomer is a compound represented by Formula (100),

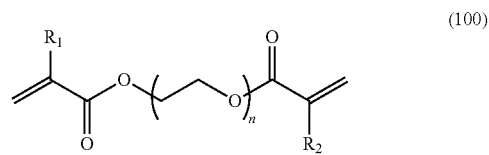

(100)

here, in Formula (100), $R_1$ and $R_2$ each independently represent a hydrogen atom or a methyl group, and n represents an integer of 9 to 33.

[22] The composition for forming a plated layer according to any one of [18] to [21],
in which the polymer having a functional group which interacts with a plating catalyst or a precursor of the plating catalyst is a polymer having a repeating unit derived from a conjugated diene compound, and a repeating unit derived from an unsaturated carboxylic acid or a derivative of the unsaturated carboxylic acid.

[23] The composition for forming a plated layer according to any one of [18] to [22],
in which the polymer having a functional group which interacts with a plating catalyst or a precursor of the plating catalyst is a butadiene-maleic acid copolymer.

According to the present invention, it is possible to provide a precursor film for producing a conductive film, in which stretchability of a plated layer obtained by curing a plated layer precursor layer is excellent even in a case of the molding at a temperature lower than the temperature in the related art.

In addition, according to the present invention, it is possible to provide a substrate with a plated layer, a conductive film, a touch panel sensor, a touch panel, a method for producing a conductive film, and a composition for forming a plated layer.

DESCRIPTION OF THE PREFERRED EMBODIMENTS

Figure 1:
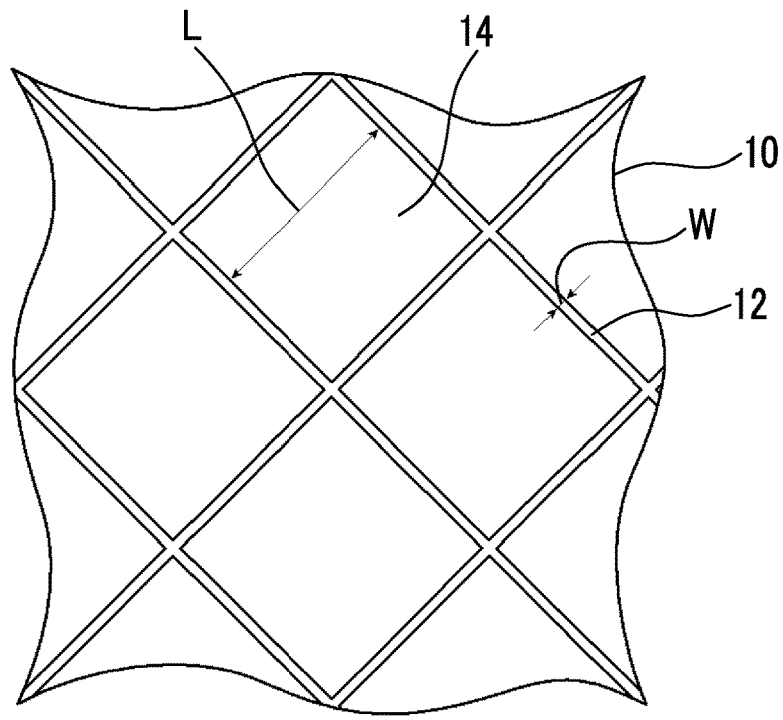
FIG. 1 is a top view of a substrate having a mesh-shaped plated layer.

Hereinafter, the present invention will be described in detail.

In the present specification, the numerical range expressed using "to" means a range including numerical values described before and after "to" as a lower limit value and an upper limit value, respectively. In addition, the drawings in the present invention are schematic views for facilitating the understanding of the invention, and the relationship of the thickness of each layer, the positional relationship of each layer, or the like does not necessarily match the actual one.

As one of the features of the precursor film for producing a conductive film in an embodiment of the present invention (hereinafter, sometimes simply referred to as "the precursor film according to the embodiment of the present invention"), the point that a plated layer precursor layer includes a bifunctional radical-polymerizable monomer having a specific linking chain length, and a polymer having a functional group which interacts with a plating catalyst or a precursor of the plating catalyst is exemplified.

In the present invention, it is considered that, by using a bifunctional radical-polymerizable monomer having 25 to 100 atoms in a main chain of a linking chain, it is possible to increase a distance between crosslinking points of the polymer and lower the glass transition temperature of a three-dimensional crosslinked polymer obtained by exposing the plated layer precursor layer to light, thereby capable of being molded at a temperature lower than the temperature in the related art.

[Precursor Film for Producing Conductive Film]

The precursor film for producing a conductive film in an embodiment of the present invention (hereinafter, sometimes simply referred to as "the precursor film according to the embodiment of the present invention") includes a substrate, and a plated layer precursor layer disposed on the substrate.

<Substrate>

The type of substrate is not particularly limited as long as the substrate has two main surfaces and supports a patterned plated layer described later. As the substrate, an insulating substrate is preferable, and more specifically, a resin substrate, a ceramic substrate, a glass substrate, or the like can be used.

Examples of the material of the resin substrate include polyethylene terephthalate, polyethylene naphthalate, polyether sulfone, a polyacrylic resin, a polyurethane-based resin, polyester, polycarbonate, polysulfone, polyamide, polyarylate, polyolefin, a cellulose-based resin, polyvinyl chloride, and a cycloolefin-based resin.

As the resin substrate, a substrate formed of a resin having a glass transition temperature of 100° C. or lower is preferable, and any one kind selected from the group consisting of a polypropylene-based resin substrate, a polymethyl methacrylate-based resin substrate, and a polyethylene terephthalate-based resin substrate is preferable.

The glass transition temperature of a resin can be measured by, for example, differential scanning calorimetry (DSC), thermomechanical analysis (TMA), or dynamic mechanical analysis (DMA).

The thickness (mm) of the substrate is not particularly limited, but from the viewpoint of the balance between handleability and thickness reduction, is preferably 0.05 mm to 2 mm and more preferably 0.1 mm to 1 mm.

In addition, it is preferable that the substrate properly transmits light. Specifically, the total light transmittance of the substrate is preferably 85% to 100%.

In addition, the substrate may have a multilayer structure, and for example, one of the layers may be a functional film. In addition, the substrate itself may be a functional film. Examples of the functional film include, but are not particularly limited to, a polarizing plate, a phase difference film, a cover plastic, a hard coat film, a barrier film, a pressure sensitive film, an electromagnetic wave shielding film, a heat-generating film, an antenna film, and a wiring film for a device other than a touch panel.

Specific examples of the functional film used for a liquid crystal cell particularly associated with a touch panel include a polarizing plate such as NPF series (manufactured by Nitto Denko Corporation) and HLC2 series (manufactured by Sanritz Corporation); a phase difference film such as a WV film (manufactured by Fujifilm Corporation); a cover plastic such as FAINDE (manufactured by Dai Nippon Printing Co., Ltd.), TECHNOLLOY (manufactured by Sumitomo Chemical Co., Ltd.), IUPILON (manufactured by Mitsubishi Gas Chemical Company), SILPLUS (manufactured by Nippon Steel & Sumikin Chemical Co., Ltd.), ORGA (manufactured by Nippon Synthetic Chemical Industry Co., Ltd.), and SHORAYAL (manufactured by Showa Denko K.K.); and a hard coat film such as H series (manufactured by Lintec Corporation), FHC series (manufactured by Higashiyama Film Co., Ltd.), and a KB film (manufactured by Kimoto Co., Ltd.). These may form a patterned plated layer on the surface of each functional film.

In addition, cellulose triacetate may be occasionally used for a polarizing plate or a phase difference film as described in JP2007-026426A. However, from the viewpoint of resistance to a plating process, a cycloolefin (co)polymer can be used in place of the cellulose triacetate, and examples thereof include ZEONOR (manufactured by Zeon Corporation).

<Primer Layer>

A primer layer is a layer disposed between the above-described substrate and a plated layer precursor layer described later.

The thickness of the primer layer is not particularly limited, but is preferably 0.01 to 100 μm and more preferably 0.05 to 20 μm.

The material of the primer layer is not particularly limited, but a resin having good adhesiveness to the substrate is preferable. Examples of the resin include an acrylate resin, a methacrylate resin, an epoxy resin, a phenol resin, a polyimide resin, a polyester resin, a bismaleimide resin, a polyolefin resin, and a polyurethane resin.

As will be described in detail later, it is preferable that the primer layer is formed by using a composition for forming a primer layer, which contains predetermined components.

The composition for forming a primer layer preferably contains the above-described resin or a precursor of the resin, and a solvent.

<Plated Layer Precursor Layer and Composition for Forming Plated Layer>

The plated layer precursor layer includes a bifunctional radical-polymerizable monomer (hereinafter, sometimes simply referred to as a "bifunctional monomer"), and a polymer having a functional group which interacts with a plating catalyst or a precursor of the plating catalyst (hereinafter, sometimes simply referred to as an "interacting polymer").

In the precursor film according to the embodiment of the present invention, it is preferable that the plated layer precursor layer is formed of a composition for forming a plated layer described later.

The composition for forming a plated layer includes the bifunctional monomer and the interacting polymer.

The method of forming the plated layer precursor layer on the substrate will be described later.

The thickness of the plated layer precursor layer is not particularly limited, but is preferably 0.01 to 100 μm and more preferably 0.05 to 20 μm.

The bifunctional monomer has 25 to 100 atoms in a main chain of a linking chain which links two radical-polymerizable groups.

Here, the main chain of the linking chain refers to the longest linearly bonded portion of the linking chain which links two radical-polymerizable groups.

Hereinafter, respective components included in the plated layer precursor layer and the composition for forming a plated layer will be described.

<<Bifunctional Monomer>>

The bifunctional monomer is not particularly limited as long as the bifunctional monomer has 25 to 100 atoms in the main chain of the linking chain which links two radical-polymerizable groups. Here, the number of atoms in the main chain refers to the number of atoms constituting a skeleton. For example, the number of atoms in an oxyethylene unit "—$CH_2$—$CH_2$—O—" of the main chain is 3.

(Number of Atoms in Main Chain of Linking Chain)

The number of atoms in the main chain of the linking chain which links two radical-polymerizable groups is 25 to 100, preferably 30 to 100, more preferably 40 to 100, and still more preferably 50 to 100.

(Radical-Polymerizable Group)

The radical-polymerizable group is not particularly limited, and examples thereof include an acryloyloxy group, a methacryloyloxy group, an acrylamide group, a methacrylamide group, a vinyl group, and a styryl group. The radical-polymerizable group is preferably a group selected from the group consisting of an acryloyloxy group, a methacryloyloxy group, an acrylamide group, and a methacrylamide group.

Here, the acryloyloxy group is a group represented by Formula (A) (IUPAC name: prop-2-enoyloxy group), and the methacryloyloxy group is a group represented by Formula (B) (IUPAC name: 2-methylprop-2-enoyloxy group). * represents a bonding site. IUPAC is an abbreviation for international union of pure and applied chemistry.

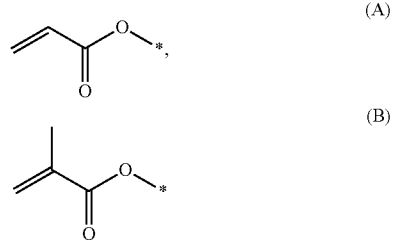

In addition, the acrylamide group is a functional group represented by Formula (C), and the methacrylamide group is a functional group represented by Formula (D). * represents a bonding site.

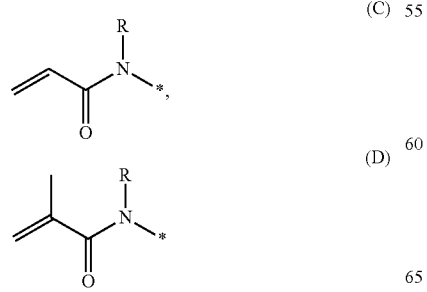

Here, in Formula (C) and Formula (D), R's each independently represent a hydrogen atom or a substituent. The type of the substituent is not particularly limited, and examples thereof include known substituents (for example, an aliphatic hydrocarbon group, an aromatic hydrocarbon group, and the like, which may include a heteroatom; more specifically, an alkyl group, an aryl group, and the like). R is preferably a hydrogen atom. * represents a bonding site.

In a case where R is a hydrogen atom, Formula (C) represents a prop-2-enamidyl group, and Formula (D) represents a 2-methylprop-2-enamidyl group.

The bifunctional monomer preferably has a polyoxyalkylene group.

The polyoxyalkylene group is a group having an oxyalkylene group as a repeating unit. The polyoxyalkylene group is preferably a group represented by Formula (E).

-(A-O)$_m$—            Formula (E)

A represents an alkylene group. The number of carbon atoms in the alkylene group is not particularly limited, but is preferably 1 to 4 and more preferably 2 or 3. For example, in a case where A is an alkylene group having 1 carbon atom, -(A-O)— represents an oxymethylene group (—$CH_2O$—), in a case where A is an alkylene group having 2 carbon atoms, -(A-O)-represents an oxyethylene group (—$CH_2CH_2O$—), and in a case where A is an alkylene group having 3 carbon atoms, -(A-O)— represents an oxypropylene group (—$CH_2CH(CH_3)O$—, —$CH(CH_3)CH_2O$—, or —$CH_2CH_2CH_2O$—). The alkylene group may be linear or branched.

m represents the number of repetitions of the oxyalkylene group, and represents an integer of 2 or more. The number of repetitions m is limited to a number in which the number of atoms in the main chain of the linking chain is within a range of 25 to 100.

The number of carbon atoms of the alkylene groups in a plurality of oxyalkylene groups may be the same or different. For example, Formula (E) includes a plurality of repeating units represented by -(A-O)—, and the number of carbon atoms in the alkylene group of each repeating unit may be the same or different. For example, in -(A-O)$_m$—, an oxymethylene group and an oxypropylene group may be included.

In addition, in a case of including a plurality of kinds of oxyalkylene groups, the order of bonding these oxyalkylene groups is not particularly limited, and may be a random type or a block type.

(Bifunctional (Meth)Acrylate Monomer)

In a case where the radical-polymerizable group is a group selected from the group consisting of the acryloyloxy group and the methacryloyloxy group, suitable examples of the bifunctional monomer include a compound represented by Formula (1). In the present specification, "(meth)acrylate" is used as a comprehensive name of "acrylate" and "methacrylate".

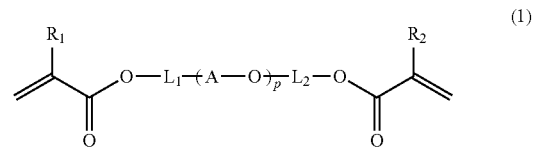

In Formula (1), $R_1$ and $R_2$ each independently represent a hydrogen atom or a methyl group, A represents an alkylene group, and p represents the number of repetitions of the oxyalkylene unit (A-O).

The definition of A is the same as the definition of A in Formula (E).

$L_1$ and $L_2$ represent a single bond or a divalent linking group. The type of the divalent linking group is not particularly limited, and examples thereof include a divalent hydrocarbon group (which may be a divalent saturated hydrocarbon group or a divalent aromatic hydrocarbon group; the divalent saturated hydrocarbon group may be any of linear forms, branched forms, or cyclic forms, and preferably has 1 to 20 carbon atoms, and examples thereof include an alkylene group; the divalent aromatic hydrocarbon group preferably has 5 to 20 carbon atoms, and examples thereof include a phenylene group; other than these groups, the divalent hydrocarbon group may be an alkenylene group or an alkynylene group), a divalent heterocyclic group, —O—, —S—, —SO$_2$—, —NR$_{10}$—, —CO— (—C(=O)—), —COO— (—C(=O)O—), —NR$_{10}$—CO—, —CO—NR$_{10}$—, —SO$_3$—, —SO$_2$NR$_{10}$—, and a group of a combination of two or more kinds thereof. Here, Rio represents a hydrogen atom or an alkyl group (preferably having 1 to 10 carbon atoms).

A hydrogen atom in the divalent linking group may be substituted with another substituent such as a halogen atom.

p is an integer in which the number of atoms in the main chain of "-L$_1$-(A-O)$_p$-L$_2$-" which links two radical-polymerizable groups is within a range of 25 to 100.

Examples of a suitable aspect of the compound represented by Formula (1) include a compound represented by Formula (10).

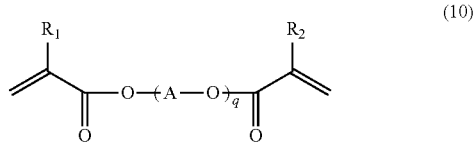

(10)

$R_1$, $R_2$, and A in Formula (10) respectively have the same meaning as $R_1$, $R_2$, and A in Formula (1), and q represents the number of repetitions of the oxyalkylene unit (A-O).

q is an integer in which the number of atoms in the main chain of "-(A-O)$_{q-1}$-A-" which links two radical-polymerizable groups is within a range of 25 to 100. For example, in a case where A is an ethylene group, q is an integer of 3 to 33, and in a case where A is an n-propylene group, q is an integer of 6 to 24.

As the compound represented by Formula (1), a compound represented by Formula (100) is more preferable.

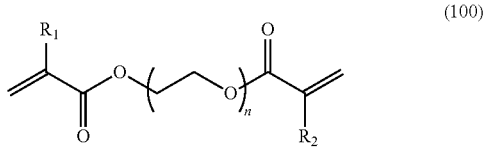

(100)

$R_1$ and $R_2$ in Formula (100) respectively have the same meaning as $R_1$ and $R_2$ in Formula (1), and n is an integer of 9 to 33.

Specific examples of the compound represented by Formula (100) include a compound represented by Formula (100), in which $R_1$ and $R_2$ are both hydrogen atoms or methyl groups, and n is 9, 14, or 23, but the compound represented by Formula (100) is not limited thereto.

(Bifunctional (Meth)Acrylamide Monomer)

In a case where the radical-polymerizable group is a group selected from the group consisting of the acrylamide group and the methacrylamide group, suitable examples of the bifunctional monomer include a compound represented by Formula (2).

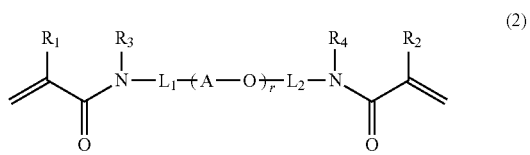

(2)

In Formula (2), $R_1$ and $R_2$ each independently represent a hydrogen atom or a methyl group, $R_3$ and $R_4$ each independently represent a hydrogen atom or a substituent, $L_1$ and $L_2$ each independently represent a single bond or a divalent linking group, A represents an alkylene group, and r represents the number of repetitions of the oxyalkylene unit (A-O).

The definition of A is the same as the definition of A in Formula (E).

The definition of $L_1$ and $L_2$ is the same as the definition of $L_1$ and $L_2$ in Formula (1).

The type of the substituent represented by $R_3$ and $R_4$ is not particularly limited, and examples thereof include known substituents (for example, an aliphatic hydrocarbon group, an aromatic hydrocarbon group, and the like, which may include a heteroatom; more specifically, an alkyl group, an aryl group, and the like).

r is an integer in which the number of atoms in the main chain of "-L$_1$-(A-O)$_r$-L$_2$-" which links two radical-polymerizable groups is within a range of 25 to 100.

Examples of a suitable aspect of the compound represented by Formula (2) include a compound represented by Formula (20).

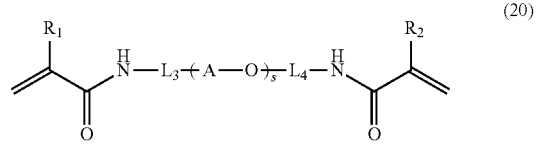

(20)

In Formula (20), $R_1$, $R_2$, and A respectively have the same meaning as $R_1$, $R_2$, and A in Formula (2), $L_3$ and $L_4$ each independently represent —O—, an alkylene group having 1 to 4 carbon atoms, a group represented by Formula (F), or a divalent linking group of a combination of these groups, and s represents the number of repetitions of the oxyalkylene unit (A-O).

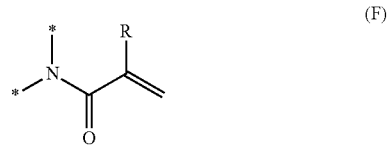

(F)

In Formula (F), R represents a hydrogen atom or a methyl group, and * represents a bonding site.

s is an integer in which the number of atoms in the main chain of "-L$_3$-(A-O)$_s$-L$_4$-" which links two radical-polymerizable groups is within a range of 25 to 100.

(Content of Bifunctional Monomer)

The content of the bifunctional monomer in the plated layer precursor layer (or the composition for forming a plated layer) is not particularly limited, and is usually 10% by mass to 90% by mass with respect to the total solid content. However, from the viewpoint that tackiness of the plated layer precursor layer is further suppressed, the content of the bifunctional monomer, with respect to the total solid content, is preferably 20% by mass to 80% by mass, and from the viewpoint that the balance between stretchability of the plated layer and plating depositability is more excellent, the content of the bifunctional monomer is more preferably 25% by mass to 75% by mass.

Here, the solid content means components, excluding a solvent, constituting the plated layer. Even in a case where a component is liquid, the component is included in the solid content as long as the component constitutes the plated layer.

<<Interacting Polymer>>

The interacting polymer is a polymer having a functional group which interacts with a plating catalyst or a precursor of the plating catalyst (hereinafter, sometimes simply referred to as an "interacting group").

(Interacting Group)

The interacting group means a functional group that can interact with a plating catalyst or a precursor of the plating catalyst, which are applied to the plated layer, and examples thereof include a functional group which can form an electrostatic interaction with the plating catalyst or a precursor of the plating catalyst, and a nitrogen-containing functional group, a sulfur-containing functional group, and an oxygen-containing functional group, which can form a coordination with the plating catalyst or a precursor of the plating catalyst.

Examples of the interacting group include nitrogen-containing functional groups such as an amino group, an amide group, an imide group, a urea group, a tertiary amino group, an ammonium group, an amidino group, a triazine group, a triazole group, a benzotriazole group, an imidazole group, a benzimidazole group, a quinoline group, a pyridine group, a pyrimidine group, a pyrazine group, a quinazoline group, a quinoxaline group, a purine group, a piperidine group, a piperazine group, a pyrrolidine group, a pyrazole group, an aniline group, a group including an alkylamine structure, a group including an isocyanuric structure, a nitro group, a nitroso group, an azo group, a diazo group, an azide group, a cyano group, and a cyanate group; oxygen-containing functional groups such as an ether group, a hydroxyl group, a phenolic hydroxyl group, a carboxylic acid group, a carbonate group, a carbonyl group, an ester group, a group including an N-oxide structure, a group including an S-oxide structure, and a group including an N-hydroxy structure; sulfur-containing functional groups such as a thiophene group, a thiol group, a thiourea group, a thiocyanuric acid group, a benzthiazole group, a mercaptotriazine group, a thioether group, a thioxy group, a sulfoxide group, a sulfone group, a sulfite group, a group including a sulfoximine structure, a group including a sulfoxonium salt structure, a sulfonic acid group, and a group including a sulfonic acid ester structure; phosphorus-containing functional groups such as a phosphate group, a phosphoramide group, a phosphine group, and a group including a phosphoric acid ester structure; and groups including a halogen atom such as a chlorine atom and a bromine atom. In a case of a functional group capable of having a salt structure, a salt thereof can also be used.

As the interacting group, from the viewpoint of high polarity and high adsorption ability to the plating catalyst or a precursor of the plating catalyst, an ionic polar group such as a carboxylic acid group, a sulfonic acid group, a phosphoric acid group, and a boronic acid group, or a cyano group is preferable, and a carboxylic acid group or a cyano group is more preferable.

The interacting polymer may have two or more kinds of interacting groups.

It is preferable that the interacting polymer includes a repeating unit having the interacting group.

Examples of one suitable aspect of the repeating unit having the interacting group include a repeating unit represented by Formula (G).

(G)

In Formula (G), $R_5$ represents a hydrogen atom or an alkyl group, $L_5$ represents a single bond or a divalent linking group, and X represents an interacting group.

The alkyl group is not particularly limited, but an alkyl group having 1 to 5 carbon atoms is preferable and an alkyl group having 1 to 3 carbon atoms is more preferable. Specific examples of the alkyl group include a methyl group, an ethyl group, a 2-propyl group (isopropyl group), and a propyl group (n-propyl group). Among these, a methyl group or an ethyl group is preferable.

The divalent linking group is not particularly limited, and examples thereof include a divalent hydrocarbon group (which may be a divalent saturated hydrocarbon group or a divalent aromatic hydrocarbon group; the divalent saturated hydrocarbon group may be any of linear forms, branched forms, or cyclic forms, and preferably has 1 to 20 carbon atoms, and examples thereof include an alkylene group; the divalent aromatic hydrocarbon group preferably has 5 to 20 carbon atoms, and examples thereof include a phenylene group; other than these groups, the divalent hydrocarbon group may be an alkenylene group or an alkynylene group), a divalent heterocyclic group, —O—, —S—, —SO$_2$—, —NR$_{10}$—, —CO— (—C(=O)—), —COO— (—C(=O)O—), —NR$_{10}$—CO—, —CO—NR$_{10}$—, —SO$_3$—, —SO$_2$NR$_{10}$—, and a group of a combination of two or more kinds thereof. Here, Rio represents a hydrogen atom or an alkyl group (preferably having 1 to 10 carbon atoms).

A hydrogen atom in the divalent linking group may be substituted with another substituent such as a halogen atom.

The interacting group is as described above.

Examples of another suitable aspect of the repeating unit having the interacting group include a repeating unit derived from an unsaturated carboxylic acid or a derivative of the unsaturated carboxylic acid.

The unsaturated carboxylic acid is an unsaturated compound having a carboxylic acid group (—COOH group). Examples of the derivative of the unsaturated carboxylic acid include an anhydride of the unsaturated carboxylic acid, a salt of the unsaturated carboxylic acid, and a monoester of the unsaturated carboxylic acid.

Examples of the unsaturated carboxylic acid include acrylic acid, methacrylic acid, crotonic acid, isocrotonic acid, maleic acid, fumaric acid, itaconic acid, and citraconic acid.

The content of the repeating unit having the interacting group in the interacting polymer is not particularly limited, but from the viewpoint of the balance between stretchability of the plated layer and plating depositability, is preferably 1% to 90% by mole and more preferably 30% to 70% by mole with respect to all repeating units.

(Polymerizable Functional Group)

The interacting polymer may further have a polymerizable functional group.

The polymerizable functional group means a functional group capable of forming a chemical bond by energy application, and examples thereof include a radical-polymerizable functional group and a cation-polymerizable functional group.

As the polymerizable functional group, from the viewpoint of more excellent reactivity, a radical-polymerizable functional group is preferable.

Examples of the radical-polymerizable functional group include an alkenylene group, an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, and a maleic acid ester group, a styryl group, a vinyl group, an acrylamide group, and a methacrylamide group.

The polymerizable group may be included in either of the main chain or side chain of the interacting polymer. For example, the alkenylene group may be included in the main chain.

(Suitable Aspect of Interacting Polymer)

From the viewpoint that the plated layer is easily formed with a small amount of energy application (for example, exposure dose), examples of a suitable aspect of the interacting polymer include a polymer X having a repeating unit derived from a conjugated diene compound, and a repeating unit derived from an unsaturated carboxylic acid or a derivative of the unsaturated carboxylic acid.

The description of the repeating unit derived from an unsaturated carboxylic acid or a derivative of the unsaturated carboxylic acid is as described above.

The conjugated diene compound is not particularly limited as long as a compound having a molecular structure which has two carbon-carbon double bonds separated by one single bond.

Examples of the conjugated diene compound include isoprene, 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, 2,3-dimethyl-butadiene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-di methyl-1,3-pentadiene, 4-methyl-1,3-pentadiene, 2-hexyl-1,3-butadiene, 3-methyl-1,3-hexadiene, 2-benzyl-1,3-butadiene, and 2-p-tolyl-1,3-butadiene.

Among these, from the viewpoint that the polymer X is easily synthesized and the characteristics of the plated layer are more excellent, the repeating unit derived from the conjugated diene compound is preferably a repeating unit derived from a compound having a butadiene skeleton represented by Formula (3).

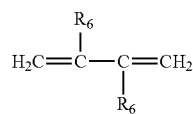

(3)

In Formula (3), $R_6$'s each independently represent a hydrogen atom, a halogen atom, or a hydrocarbon group. Examples of the hydrocarbon group include an aliphatic hydrocarbon group (for example, an alkyl group, an alkenyl group, and the like; preferably having 1 to 12 carbon atoms) and an aromatic hydrocarbon group (for example, a phenyl group, a naphthyl group, and the like). A plurality of $R_6$'s may be the same as or different from each other.

Examples of the compound (monomer having a butadiene structure) having a butadiene skeleton represented by Formula (3) include 1,3-butadiene, isoprene, 2-ethyl-1,3-butadiene, 2-n-propyl-1,3-butadiene, 2,3-dimethyl-1,3-butadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, and 2-cyano-1,3-butadiene.

The content of the repeating unit derived from the conjugated diene compound in the polymer X is preferably 25% to 75% by mole with respect to all repeating units.

The content of the repeating unit derived from the unsaturated carboxylic acid or the derivative of the unsaturated carboxylic acid in the polymer X is preferably 25% to 75% by mole with respect to all repeating units.

(Weight-Average Molecular Weight of Interacting Polymer)

The weight-average molecular weight of the interacting polymer is not particularly limited, but from the viewpoint of more excellent handleability, is preferably 10,000 to 700,000 and more preferably 20,000 to 500,000.

(Specific Examples of Interacting Polymer)

Specific examples of the interacting polymer include a butadiene-maleic acid copolymer which is an alternating copolymer of 1,3-butadiene and maleic acid anhydride, a polyacrylic acid, and a polymethacrylic acid, but the interacting polymer is not limited thereto.

(Content of Interacting Polymer)

The content of the interacting polymer in the plated layer precursor layer (or the composition for forming a plated layer) is not particularly limited, and is usually 10% by mass to 90% by mass with respect to the total solid content. However, from the viewpoint that tackiness of the plated layer precursor layer is further suppressed, the content of the bifunctional monomer, with respect to the total solid content, is preferably 20% by mass to 80% by mass, and from the viewpoint that the balance between stretchability of the plated layer and plating depositability is more excellent, the content of the bifunctional monomer is more preferably 25% by mass to 75% by mass.

Here, the solid content means components, excluding a solvent, constituting the plated layer. Even in a case where a component is liquid, the component is included in the solid content as long as the component constitutes the plated layer.

The ratio (Mass of interacting polymer/Mass of bifunctional monomer) of the mass of the interacting polymer to the mass of the bifunctional monomer is not particularly limited, and is usually 0.1 to 10. However, from the viewpoint that tackiness of the plated layer precursor layer is further suppressed, the ratio is preferably 0.3 to 3.0 and more preferably 0.5 to 1.5.

<<Polymerization Initiator>>

In the present invention, the plated layer precursor layer (or the composition for forming a plated layer) may include a polymerization initiator. By including the polymerization initiator, the reaction between the polymerizable functional groups during an exposure treatment more efficiently proceeds.

The polymerization initiator is not particularly limited, and a known polymerization initiator (so-called photopolymerization initiator) or the like can be used. Examples of the polymerization initiator include benzophenones, acetophenones, α-aminoalkylphenones, benzoins, ketones, thioxanthones, benzyls, benzyl ketals, oxime esters, anthrones, tetramethylthiuram monosulfides, bisacylphosphine oxides, acylphosphine oxides, anthraquinones, azo compounds, and derivatives thereof.

The content of the polymerization initiator in the composition for forming a plated layer is not particularly limited, but from the viewpoint of curability of the plated layer, is preferably 0.1% to 20% by mass and more preferably 1% to 10% by mass with respect to the total 100% by mass of the bifunctional monomer and the interacting polymer.

<<Solvent>>

From the viewpoint of handleability, the composition for forming a plated layer preferably includes a solvent.

The usable solvent is not particularly limited, and examples thereof include water; an alcohol-based solvent such as methanol, ethanol, propanol, ethylene glycol, 1-methoxy-2-propanol, glycerin, and propylene glycol monomethyl ether; an acid such as acetic acid; a ketone-based solvent such as acetone, methyl ethyl ketone, and cyclohexanone; an amide-based solvent such as formamide, dimethylacetamide, and N-methylpyrrolidone; a nitrile-based solvent such as acetonitrile and propionitrile; an ester-based solvent such as methyl acetate and ethyl acetate; a carbonate-based solvent such as dimethyl carbonate and diethyl carbonate; an ether-based solvent, a glycol-based solvent, an amine-based solvent, a thiol-based solvent, and a halogen-based solvent.

Among them, an alcohol-based solvent, an amide-based solvent, a ketone-based solvent, a nitrile-based solvent, or a carbonate-based solvent is preferable.

The content of the solvent in the composition for forming a plated layer is not particularly limited, but is preferably 50% by mass to 98% by mass and more preferably 70% by mass to 98% by mass with respect to the total amount of the composition. In a case where the content of the solvent is within the above-described range, handleability of the composition is excellent and the layer thickness of the patterned plated layer, or the like is easily controlled.

<<Other Additives>>

The composition for forming a plated layer may include other additives (for example, a sensitizer, a curing agent, a polymerization inhibitor, an antioxidant, an antistatic agent, an ultraviolet absorbing agent, a filler, particles, a flame retardant, a surfactant, a lubricant, a plasticizer, and the like) as necessary.

<<Method for Producing Composition for Forming Plated Layer>>

The method for producing the composition for forming a plated layer is not particularly limited, and examples thereof include a known method. Examples thereof include a method of collectively mixing the above-described respective components, and a method of mixing the respective components stepwise.

<Method for Producing Precursor Film>

Using the above-described composition for forming a plated layer, a plated layer precursor layer can be formed on a substrate. The plated layer precursor layer is a precursor layer which is subjected to a curing treatment to be a plated layer, and is a layer in an uncured state before being subjected to the curing treatment.

As a method for producing the plated layer precursor layer, a method having the following step is preferable.

Step 1: step of forming a primer layer on a substrate by contacting a composition for forming a primer layer with the substrate, and then forming the primer layer and a plated layer precursor layer on the substrate by contacting a composition for forming a plated layer to the primer layer formed on the substrate Step 1 is a step of forming a primer layer on a substrate by contacting a composition for forming a primer layer with the substrate, and further, forming the primer layer and a plated layer precursor layer on the substrate by contacting a composition for forming a plated layer with the primer layer formed on the substrate. By performing this step, a substrate with a plated layer precursor layer, which has a substrate, a primer layer disposed on the substrate, and a plated layer precursor layer disposed on the primer layer, is obtained.

The method of contacting the composition for forming a primer layer with the substrate is not particularly limited, and examples thereof include a method of applying the composition for forming a primer layer onto the substrate, and a method of immersing the substrate in the composition for forming a primer layer.

In addition, the method of contacting a composition for forming a plated layer with the primer layer formed on the substrate is not particularly limited, and examples thereof include a method of applying the composition for forming a plated layer onto the primer layer of the substrate on which the primer layer is formed, and a method of immersing the substrate on which the primer layer is formed in the composition for forming a plated layer.

After contacting the primer with the substrate, as necessary, a drying treatment may be performed to remove a solvent from the primer layer. In addition, after contacting the composition for forming a plated layer with the primer layer formed on the substrate, as necessary, a drying treatment may be performed to remove a solvent from the plated layer precursor layer.

[Substrate with Plated Layer]

The substrate with a plated layer according to the embodiment of the present invention has a plated layer obtained by curing the plated layer precursor layer in the precursor film according to the embodiment of the present invention.

Using the above-described precursor film according to the embodiment of the present invention, a substrate with a plated layer can be produced. The plated layer is a layer to be subjected to a plating treatment described later, and a metal layer is formed on a surface thereof by the plating treatment.

As a method for producing the substrate with a plated layer, a method having the following step is preferable.

Step 2: step of forming a plated layer by performing a curing treatment to the plated layer precursor layer in the precursor film Step 2 is a step of forming a plated layer by performing a curing treatment to the plated layer precursor layer.

The method of the curing treatment is not particularly limited, and examples thereof include a heating treatment and an exposure treatment (light irradiation treatment). Among these, from the viewpoint that the treatment is completed in a short time, an exposure treatment is preferable. By the curing treatment, the polymerizable group included in compounds in the plated layer precursor layer is activated so that crosslinking between the compounds occurs and curing of the layer proceeds.

In a case of performing the curing treatment (particularly, exposure treatment), a curing treatment may be performed in a pattern shape so that a desired patterned plated layer is obtained. For example, it is preferable to perform the exposure treatment using a mask having an opening portion with a predetermined shape. By performing a development treatment to the plated layer precursor layer subjected to the curing treatment in a pattern shape, a patterned plated layer is formed.

The method of the development treatment is not particularly limited, and an optimal development treatment is performed depending on the type of material to be used. Examples of a developer include an organic solvent, pure water, and an alkaline aqueous solution, and an alkaline aqueous solution is preferable. Examples of the alkaline aqueous solution include a sodium carbonate aqueous solution, a sodium hydrogen carbonate aqueous solution, a potassium carbonate aqueous solution, and a potassium hydrogen carbonate aqueous solution, but the alkaline aqueous solution is not limited thereto.

By the above method, the plated layer obtained by curing the composition for forming a plated layer is disposed on the substrate. That is, the substrate with a plated layer, which has the substrate and the plated layer disposed on the substrate, is obtained.

The average thickness of the plated layer is not particularly limited, but is preferably 0.05 to 100 μm, more preferably 0.07 to 10 μm, and still more preferably 0.1 to 3 μm.

The average thickness is an average value obtained by observing a vertical cross section of the plated layer with an electron microscope (for example, scanning electron microscope), measuring thicknesses at arbitrary 10 points, and arithmetically averaging the thicknesses.

The plated layer may be formed in a pattern shape. For example, the plated layer may be formed in a mesh shape. In FIG. 1, a mesh-shaped plated layer 12 is disposed on a substrate 10.

The size of a line width W of a fine line portion constituting a mesh of the plated layer 12 is not particularly limited, but from the viewpoint of the balance between the conductive characteristics and difficulty of visual recognition of the metal layer formed on the plated layer, is preferably 30 μm or less, more preferably 15 μm or less, still more preferably 10 μm or less, and particularly preferably 5 μm or less, and is preferably 0.5 μm or more and more preferably 1.0 μm or more.

In FIG. 1, the shape of an opening portion 14 is a rhombic shape, but the shape is not limited thereto, and may be other polygonal shapes (for example, a triangular shape, a quadrangular shape, a hexagonal shape, a random polygonal shape). In addition, the shape of one side may be a curved shape or an arc shape, in addition to a linear shape. In a case of the arc shape, for example, two opposing sides may have an outwardly convex arc shape, and the other two opposing sides may have an inwardly convex arc shape. In addition, the shape of each side may be a wavy shape in which the outwardly convex arc and the inwardly convex arc are connected. Needless to say, the shape of each side may be a sine curve.

A length L of one side of the opening portion 14 is not particularly limited, but is preferably 1500 μm or less, more preferably 1300 μm or less, and still more preferably 1000 μm or less, and is preferably 5 μm or more, more preferably 30 μm or more, and still more preferably 80 μm or more. In a case where the length of one side of the opening portion is within the above-described range, transparency of a conductive film described later is more excellent.

The substrate with a plated layer may be deformed to be a substrate with a plated layer having a three-dimensional shape. That is, by deforming the substrate with a plated layer, a substrate with a plated layer (substrate with a plated layer having a three-dimensional shape), which has a substrate having a three-dimensional shape, and a plated layer (or a patterned plated layer) disposed on the substrate, is obtained.

As described above, the plated layer obtained by curing the composition for forming a plated layer has excellent stretchability, and the shape thereof can be deformed by following the deformation of the substrate.

The method of deforming the substrate with a plated layer is not particularly limited, and examples thereof include known methods such as vacuum molding, blow molding, free blow molding, pressure molding, vacuum-pressure molding, and hot press molding.

Figure 2:
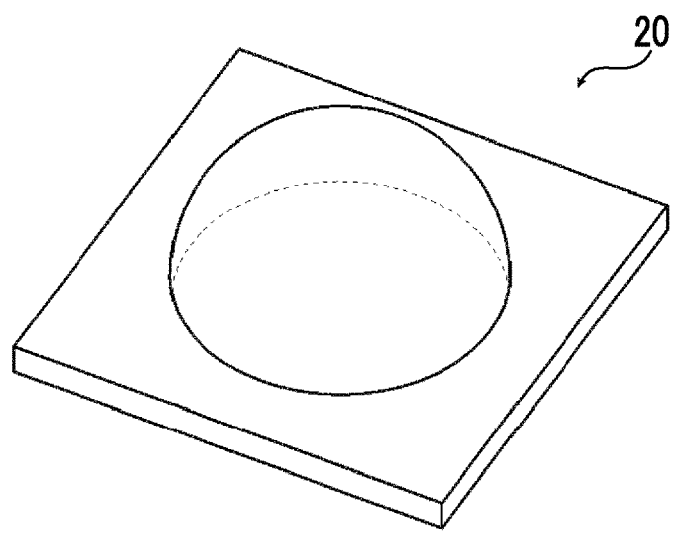
FIG. 2 is a perspective view of an embodiment of a substrate with a plated layer having a three-dimensional shape.

For example, as shown in FIG. 2, a part of the substrate with a plated layer may be deformed in a hemispherical shape to be a substrate 20 with a plated layer having a hemispherical shape. In FIG. 2, the plated layer is not shown.

The aspect in which the three-dimensional shape is applied has been described above, but the substrate with a plated layer may be subjected to a stretching treatment such as uniaxial stretching or biaxial stretching to deform the shape of the substrate with a plated layer.

The heating temperature in a case of molding the substrate with a plated layer is not particularly limited, but is preferably in a range of 60° C. to 120° C. and more preferably in a range of 80° C. to 120° C.

The aspect in which the substrate with a plated layer is deformed has been described above, but the present invention is not limited thereto, and after deforming the substrate with a plated layer precursor layer, the step 2 may be performed to obtain a substrate with a plated layer having a three-dimensional shape.

In addition, the aspect in which the plated layer precursor layer is subjected to the curing treatment in a pattern shape to form the patterned plated layer has been described above, but the present invention is not limited thereto, and it is also possible to form a patterned plated layer by disposing the plated layer precursor layer on the substrate in a pattern shape, and subjecting the patterned plated layer precursor layer to the curing treatment. Examples of disposing the patterned plated layer precursor layer include a method of applying the composition for forming a plated layer at a predetermined position on the substrate according to a screen printing method or an inkjet method.

[Conductive Film, Touch Panel Sensor, and Touch Panel]

The conductive film according to the embodiment of the present invention includes the substrate with a plated layer according to the embodiment of the present invention, and a metal layer disposed on the plated layer in the substrate with a plated layer. In addition, the touch panel sensor according to the embodiment of the present invention includes the conductive film according to the embodiment of the present invention, and the touch panel according to the embodiment of the present invention includes the touch panel sensor according to the embodiment of the present invention.

The metal layer can be formed on the plated layer by subjecting the plated layer in the substrate with a plated layer to a plating treatment. In particular, in a case of disposing the plated layer on the substrate in a pattern shape, a metal layer (patterned metal layer) is formed along the pattern.

The method of forming the metal layer is not particularly limited, and for example, it is preferable to perform a step 3 of applying a plating catalyst or a precursor of the plating catalyst to the plated layer, and a step 4 of subjecting the plated layer to which the plating catalyst or a precursor of the plating catalyst is applied to a plating treatment.

Hereinafter, the procedures of the step 3 and the step 4 will be described in detail.

Step 3 is a step of applying a plating catalyst or a precursor of the plating catalyst to the plated layer. Since the plated layer includes the interacting group, the interacting group adheres (adsorbs) the applied plating catalyst or a precursor of the plating catalyst according to the function of the interacting group.

The plating catalyst or a precursor of the plating catalyst functions as a catalyst or an electrode for the plating treatment. Therefore, the type of the plating catalyst or a precursor of the plating catalyst to be used is appropriately determined depending on the type of the plating treatment.

The plating catalyst or a precursor of the plating catalyst is preferably an electroless plating catalyst or a precursor of the electroless plating catalyst.

The electroless plating catalyst is not particularly limited as long as the catalyst serves as an active nucleus in a case of electroless plating, and examples thereof include metals (substances known as a metal capable of electroless plating and having a lower ionization tendency than that of Ni) having a catalytic ability of a self-catalytic reduction reaction. Specific examples thereof include Pd, Ag, Cu, Pt, Au, and Co.

As the electroless plating catalyst, a metal colloid may be used.

An electroless plating catalyst precursor is not particularly limited as long as the precursor acts as the electroless plating catalyst by a chemical reaction, and examples thereof include ions of the metals exemplified as the electroless plating catalyst.

Examples of the method of applying the plating catalyst or a precursor of the plating catalyst to the plated layer include a method of preparing a solution in which the plating catalyst or a precursor of the plating catalyst is dispersed or dissolved in a solvent, and applying the solution onto the plated layer, and a method of immersing the substrate with a plated layer in the solution.

Examples of the solvent include water and an organic solvent.

Step 4 is a step of subjecting the plated layer to which the plating catalyst or a precursor of the plating catalyst is applied to a plating treatment.

The method of the plating treatment is not particularly limited, and examples thereof include an electroless plating treatment and an electrolytic plating treatment (electroplating treatment). In this step, the electroless plating treatment may be performed alone, or the electrolytic plating treatment may be further performed after performing the electroless plating treatment.

Hereinafter, the procedures of the electroless plating treatment and the electrolytic plating treatment will be described in detail.

The electroless plating treatment is a treatment of depositing metals by a chemical reaction using a solution in which metal ions expected to be deposited as plating are dissolved.

As the procedure of the electroless plating treatment, for example, it is preferable that a substrate with a plated layer to which the electroless plating catalyst is applied is washed with water to remove excess electroless plating catalyst, and then immersed in an electroless plating bath. As the electroless plating bath to be used, a known electroless plating bath can be used.

In a general electroless plating bath, in addition to the solvent (for example, water), metal ions for plating, a reducing agent, and an additive (stabilizer) which improves stability of the metal ions are mainly included.

In a case where the plating catalyst or a precursor of the plating catalyst which is applied to the plated layer functions as an electrode, an electrolytic plating treatment can be performed to the plated layer to which the catalyst of a precursor of the catalyst is applied.

As described above, the electrolytic plating treatment can be performed as necessary after the electroless plating treatment. In such a form, the thickness of the metal layer to be formed can be appropriately adjusted.

The aspect in which the step 3 is performed has been described above, but in a case where the plating catalyst or a precursor of the plating catalyst is included in the plated layer, the step 3 may not be performed.

By performing the above treatment, the metal layer is formed on the plated layer. That is, a conductive film, which includes the substrate with a plated layer and the metal layer disposed on the plated layer in the substrate with a plated layer, is obtained.

By disposing the patterned plated layer on the substrate according to the shape of the patterned metal layer to be a desired shape, a conductive film having a patterned metal layer having a desired shape can be obtained. For example, in a case of being desired to obtain a mesh-shaped metal layer, it is sufficient to form a mesh-shaped plated layer.

In addition, in a case where the steps 3 and 4 are performed using the substrate with a plated layer having a three-dimensional shape, a conductive film having a three-dimensional shape is obtained.

The conductive film (particularly, conductive film having a three-dimensional shape) obtained by the above procedures can be applied to various applications. For example, the conductive film can be applied to various applications such as a touch panel sensor, a semiconductor chip, flexible printed circuits (FPC), a chip on film (COF), a tape automated bonding (TAB), an antenna, a multilayer wiring board, and a motherboard. Among these, it is preferable to use the conductive film for a touch panel sensor (particularly, electrostatic capacitance touch panel sensor). In a case where the conductive film is applied to a touch panel sensor, the patterned metal layer functions as a detection electrode or a lead-out wiring in the touch panel sensor. Such a touch panel sensor can be suitably applied to a touch panel.

In addition, the conductive film can also be used as a heating element. For example, by applying an electric current to the patterned metal layer, the temperature of the patterned metal layer rises, and the patterned metal layer functions as a heat wire.

In the three-dimensional shape portion of the conductive film having a three-dimensional shape, the wiring pattern is deformed and the substrate is thinner than before the molding. As a result, in a case where a conductive film, which has a patterned metal layer on both surfaces and has a three-dimensional shape, is used as a touch panel sensor, the $\Delta Cm$ value of a portion where the area of the patterned metal layer which is the wiring pattern is enlarged is smaller, and the $\Delta Cm$ value of a portion where the substrate is thinner is larger.

Therefore, in the present invention, the above problems can be handled by individually setting the range of $\Delta Cm$ for each address.

In addition, other than the above method, a method of, in consideration of the degree of deformation of the patterned metal layer in a case of molding, adjusting the disposing position of the patterned metal layer in a state before molding so that the ΔCm value after molding is substantially constant in the plane is also exemplified.

Furthermore, by changing the thickness of a cover film overlapped on the patterned metal layer in the conductive film having a three-dimensional shape, it is also possible to set the ΔCm value substantially constant in the plane.

These methods can also be used in combination.

In order to increase self-supporting property of the conductive film having a three-dimensional shape, an insert molding may be used. For example, a resin layer may be laminated on the conductive film by placing the conductive film having a three-dimensional shape in a mold and filling the mold with a resin. In addition, a conductive film having excellent self-supporting property may be produced by applying a three-dimensional shape to a substrate with a plated layer before performing a plating treatment, placing the substrate with a plated layer having a three-dimensional shape in a mold, filling the mold with a resin, and subjecting the obtained laminate to the plating treatment.

In addition, in a case of decorating the conductive film having a three-dimensional shape, for example, a decorative film may be attached to the conductive film having a three-dimensional shape while molding the decorative film. Specifically, a three dimension overlay method (TOM) molding can be used.

In addition, the conductive film having a three-dimensional shape may be directly coated to be decorated.

In addition, a decorative layer may be disposed on a front surface and/or a back surface of the substrate before forming the plated layer precursor layer. In addition, in a case where the plated layer precursor layer is disposed on one surface of the substrate, a decorative layer may be formed on the other surface of the substrate, or a decorative film may be attached to the other surface of the substrate.

Furthermore, the conductive film having a three-dimensional shape may be decorated by an in-mold forming or an insert molding using a decorative film.

As one aspect of the method for producing the conductive film according to the embodiment of the present invention, a step (corresponding to the exposure treatment (light irradiation treatment) in "Step 2") of exposing the above-described precursor film, a step (corresponding to the development treatment in "Step 2") of developing the exposed film, a step (corresponding to the treatment of deforming the substrate with a plated layer after "Step 2") of molding the developed film, and a step (corresponding to "Step 3" and "Step 4") of plating the molded film may be included.

EXAMPLES

Hereinafter, the present invention will be described more specifically with reference to Examples, but the present invention is not limited to Examples.

Example 1

1. Preparation of Composition for Forming Plated Layer 50 parts by mass of a butadiene-maleic acid copolymer (hereinafter, sometimes abbreviated as "BMA") (manufactured by Wako Pure Chemical Corporation; 42% by mass aqueous solution) as the net amount of BMA, 50 parts by mass of Light Acrylate 9EG-A (manufactured by KYOE-ISHA CHEMICAL Co., Ltd.; compound represented by Formula (101); linking chain length=26; hereinafter, sometimes abbreviated as "9EG-A"), and 2.5 parts by mass of IRGACURE OXE02 (manufactured by BASF SE) were dissolved in 2000 parts by mass of isopropyl alcohol as a solvent, thereby preparing a composition for forming a plated layer (hereinafter, sometimes referred to as a "composition 1 for forming a plated layer").

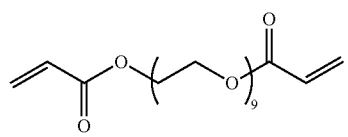

(101)

2. Production of Precursor Film

A substrate (polyethylene terephthalate film; NOA CRYSTAL-V manufactured by RP TOPLA LIMITED, thickness: 300 μm; glass transition temperature: 72° C.) was coated with Aica Aitron Z-913-3 (manufactured by Aica Kogyo Co., Ltd.) such that a primer layer having a thickness of 0.8 μm was formed on the substrate, and then the obtained coating film was irradiated with ultraviolet rays (UV) to cure the coating film and form a primer layer.

Next, the primer layer was coated with the composition 1 for forming a plated layer such that a plated layer precursor layer having a thickness of 0.9 μm was formed on the obtained primer layer, thereby obtaining a substrate with a plated layer precursor layer.

3. Production of Conductive Film

References (10, 12, 14, 20, W, and L) in the following description are the same as those in FIG. 1 or FIG. 2.

(1) Exposure Treatment

Next, using a precursor film obtained by cutting the produced precursor film into 15 cm square, a plated layer precursor layer was exposed (0.2 J) with a metal halide light source through a quartz mask having a predetermined opening pattern such that a mesh-shaped plated layer 12, which has a width W of a fine line portion of 5 μm and has a length L of one side of an opening portion of 300 μm, was formed. A plurality of precursor films obtained by cutting the precursor film into 15 cm square was prepared to produce a plurality of samples.

(2) Development Treatment 2.1) Water Development

Regarding one or more samples, the plated layer precursor layer subjected to the exposure treatment was shower-washed with water at room temperature and subjected to a development treatment to produce a substrate (substrate with a plated layer) with a mesh-shaped plated layer 12 (refer to FIG. 1). Hereinafter, a substrate with a plated layer, which is developed with only water, is sometimes referred to as a "substrate with a plated layer (water development)".

2.2) Alkaline Development

Regarding one or more other samples, the plated layer precursor layer subjected to the exposure treatment was shower-washed with a 3.0% by mass sodium carbonate aqueous solution, shower-washed with water at room temperature, and subjected to a development treatment to produce a substrate (substrate with a plated layer) with a mesh-shaped plated layer 12 (refer to FIG. 1). Hereinafter, a substrate with a plated layer, which is washed with a sodium carbonate aqueous solution in a case of the development treatment, is sometimes referred to as a "substrate with a plated layer (alkali development)".

(3) Molding

Next, a mold having a hemispherical recess having a diameter of 10 cm was heated for 1 hour or more in an oven adjusted to 90° C. After heating the mold to 90° C., the mold was taken out of the oven, and using a heat-resistant tape, the produced substrate with a patterned plated layer was attached to the mold so as to cover an opening of the recess. The mold was quickly returned to the oven and allowed to stand at 90° C. for 30 seconds, and then vacuum suction was performed for 5 seconds from an air hole at the bottom of the hemispherical recess to obtain a substrate 20 with a plated layer having a hemispherical shape (refer to FIG. 2).

(4) Plating Treatment

Next, the obtained substrate with a plated layer having a hemispherical shape (hereinafter, sometimes simply referred to as a "stereoscopic-shaped substrate with a plated layer") was immersed in a 1% by mass sodium carbonate aqueous solution at normal temperature for 5 minutes, and the taken out stereoscopic-shaped substrate with a plated layer was washed twice with pure water. After immersing in pure water for 5 minutes, the stereoscopic-shaped substrate with a plated layer was immersed in a Pd catalyst-applying solution (Omnishield 1573 activator, manufactured by Rohm and Haas Company) at 30° C. for 5 minutes, and then the taken out stereoscopic-shaped substrate with a plated layer was washed twice with pure water.

Next, the obtained stereoscopic-shaped substrate with a plated layer was immersed in a reducing solution (Circuposit P13 oxide converter 60C, manufactured by Rohm and Haas Company) at 30° C. for 5 minutes, and then the taken out stereoscopic-shaped substrate with a plated layer was washed twice with pure water.

Next, the obtained stereoscopic-shaped substrate with a plated layer was immersed in an electroless plating solution (Circuposit 4500, manufactured by Rohm and Haas Company) at 45° C. for 15 minutes, and then the taken out stereoscopic-shaped substrate with a plated layer was washed with pure water to obtain a conductive film which has a mesh-shaped metal layer (patterned metal layer) and is formed into a hemispherical shape.

4. Evaluation of Disconnection and Evaluation of Copper Deposition in Unexposed Area (1) Evaluation of Disconnection The disconnection of the conductive film formed into a hemispherical shape was inspected using an optical microscope, and the number of disconnection points was recorded. The results are shown in the column of "Number of disconnection points" in Table 1. The number of disconnection points represents the number of disconnections visually recognized with the optical microscope in a 2 cm square area of the zenith portion of the hemisphere.

(2) Evaluation of Copper Deposition in Unexposed Area

A plated copper deposition region (hereinafter, sometimes referred to as an "abnormal deposition region") in an unexposed area of the conductive film formed into a hemispherical shape was inspected using an optical microscope, and the number of abnormal deposition regions was recorded. The results are shown in the column of "Number of abnormal deposition regions" in Table 1. Here, the number of abnormal deposition regions in a case of being developed with only water is shown in the column of "Water development", and the number of abnormal deposition regions in a case of being developed with an alkaline aqueous solution and water is shown in the column of "alkali development", respectively. The number of abnormal deposition regions represents the number of abnormal deposition regions visually recognized with the optical microscope in a 2 cm square area of the zenith portion of the hemisphere.

Example 2

Example 2 was the same as Example 1, except that Light Acrylate 14EG-A (manufactured by KYOEISHA CHEMI-CAL Co., Ltd.; compound represented by Formula (102); linking chain length=41; hereinafter, sometimes abbreviated as "14EG-A") was used instead of Light Acrylate 9EG-A.

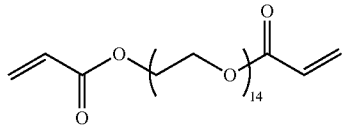

Example 3

Example 3 was the same as Example 1, except that NK Ester A-1000 (manufactured by SHIN-NAKAMURA CHEMICAL CO, LTD.; compound represented by Formula (103); linking chain length=68; hereinafter, sometimes abbreviated as "A-1000") was used instead of Light Acrylate 9EG-A.

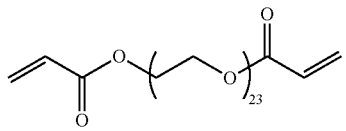

Example 4

Example 4 was the same as Example 1, except that Light Ester 9EG (manufactured by KYOEISHA CHEMICAL Co., Ltd.; compound represented by Formula (104); linking chain length=26; hereinafter, sometimes abbreviated as "9EG") was used instead of Light Acrylate 9EG-A.

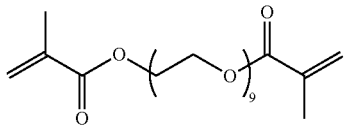

Example 5

Example 5 was the same as Example 1, except that Light Ester 14EG (manufactured by KYOEISHA CHEMICAL Co., Ltd.; compound represented by Formula (105); linking chain length=41; hereinafter, sometimes abbreviated as "14EG") was used instead of Light Acrylate 9EG-A.

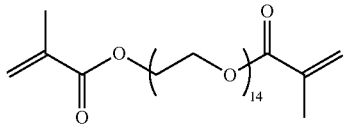

Example 6

Example 6 was the same as Example 1, except that NK Ester 23G (manufactured by SHIN-NAKAMURA CHEMI- CAL CO, LTD.; compound represented by Formula (106); linking chain length=68; hereinafter, sometimes abbreviated as "23G") was used instead of Light Acrylate 9EG-A.

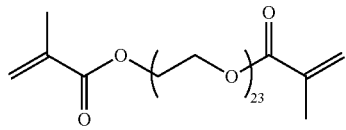

(106)

Example 7

Example 7 was the same as Example 1, except that Omnirad 127 (manufactured by IGM Resins B.V.) was used instead of IRGACURE OXE02, and Deep UV lamp (manufactured by Ushio Inc.) was used as a light source in a case of exposure.

Comparative Example 1

Comparative Example 1 was the same as Example 1, except that a bifunctional acrylamide represented by Formula (201) (linking chain length=13; compound synthesized according to paragraph 0187 of Kokai Giho (Journal of Technical Disclosure) 2013-502654; hereinafter, sometimes abbreviated as "A") was used instead of Light Acrylate 9EG-A.

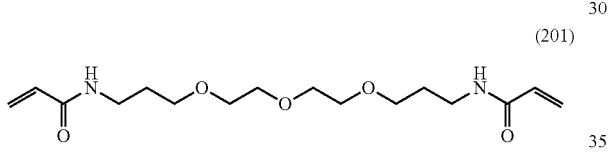

(201)

Comparative Example 2

Comparative Example 2 was the same as Example 1, except that Light Acrylate 4EG-A (manufactured by KYOEISHA CHEMICAL Co., Ltd.; compound represented by Formula (107); linking chain length=11; hereinafter, sometimes abbreviated as "4EG-A") was used instead of Light Acrylate 9EG-A.

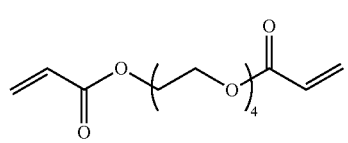

(107)

Comparative Example 3

Comparative Example 3 was the same as Example 1, except that Light Ester 4EG (manufactured by KYOEISHA CHEMICAL Co., Ltd.; compound represented by Formula (108); linking chain length=11; hereinafter, sometimes abbreviated as "4EG") was used instead of Light Acrylate 9EG-A.

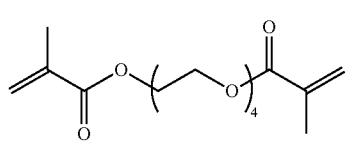

(108)

TABLE 1

| | | | Example | | | | | | | Comparative Example | | |
|---|---|---|---|---|---|---|---|---|---|---|---|---|
| | | | 1 | 2 | 3 | 4 | 5 | 6 | 7 | 1 | 2 | 3 |
| Composition for forming plated layer | Interacting polymer[X1] | BMA | 50 | 50 | 50 | 50 | 50 | 50 | 50 | 50 | 50 | 50 |
| | Bifunctional monomer[X1,2] | 9EG-A (26) | 50 | | | | | | 50 | | | |
| | | 14EG-A (41) | | 50 | | | | | | | | |
| | | A-1000 (68) | | | 50 | | | | | | | |
| | | 9EG (26) | | | | 50 | | | | | | |
| | | 14EG (41) | | | | | 50 | | | | | |
| | | 23G (68) | | | | | | 50 | | | | |
| | | A (13) | | | | | | | | 50 | | |
| | | 4EG-A (11) | | | | | | | | | 50 | |
| | | 4EG (11) | | | | | | | | | | 50 |
| | Initiator | IRGACURE OXE02 | 2.5 | 2.5 | 2.5 | 2.5 | 2.5 | 2.5 | | 2.5 | 2.5 | 2.5 |
| | | Omnirad 127 | | | | | | | 2.5 | | | |
| Evaluation | Number of disconnection points | | 0 | 0 | 0 | 0 | 0 | 0 | 0 | 10 | 23 | 18 |
| | Number of abnormal deposition regions | Water treatment | 15 | 8 | 0 | 21 | 7 | 0 | 15 | 0 | 22 | 21 |
| | | Alkali treatment | 0 | 0 | 0 | 0 | 0 | 0 | 0 | 0 | 13 | 10 |

[X1]The content of respective components in the composition for forming a plated layer is represented by parts by mass.
[X2]The number in parentheses after the abbreviation for the bifunctional monomer represents the linking chain length (number of atoms).

[Explanation of Results]

<Number of Disconnection Points>

In Examples 1 to 7, the number of disconnection points was 0, and the plated layer had excellent stretchability.

On the other hand, in Comparative Examples 1 to 3, the number of disconnection points was 10 or more, and stretchability of the plated layer was poor.

This is assumed that, even in a case where the molding was performed at 90° C., which is a lower temperature than the temperature in the related art, stretchability of the plated layer was sufficient and disconnection was avoided due to the long linking chain length between radical-polymerizable groups.

<Number of Abnormal Deposition Regions>

Examples 1 to 3 are examples in which bifunctional acrylate monomers having different linking chain lengths were used as the bifunctional monomer. In a case of water development, it was observed that the number of abnormal deposition regions tends to decrease as the linking chain is longer. However, in a case of alkali development, no difference in the number of abnormal deposition regions due to the length of the linking chain was observed, and even in a case where the linking chain is short, the number of abnormal deposition regions was 0, which is excellent.

Examples 4 to 6 are examples in which bifunctional methacrylate monomers having different linking chain lengths were used as the bifunctional monomer. Same as Examples 1 to 3, in a case of water development, it was observed that the number of abnormal deposition regions tends to decrease as the linking chain is longer. However, in a case of alkali development, no difference in the number of abnormal deposition regions due to the length of the linking chain was observed, and even in a case where the linking chain is short, the number of abnormal deposition regions was 0, which is excellent.

Comparative Examples 2 and 3 are examples in which an acrylate monomer having a linking chain length of 11 and a methacrylate monomer having a linking chain length of 11 were respectively used as the bifunctional monomer. The number of abnormal deposition regions was large, which is inferior. The reason is that, first, as hydrophobicity is higher due to that the number of repeating units of oxyethylene in the bifunctional acrylate monomer and the bifunctional methacrylate monomer is small, affinity with the primer layer is higher. Therefore, it is considered that, since the permeation of the interacting polymer into the primer layer is promoted and the primer layer into which the interacting polymer permeates has plating activity, there is a portion to be plated regardless of the pattern of the plated layer.

Comparative Example 1 is an example in which an acrylamide monomer having a linking chain length of 13 was used as the bifunctional monomer. It is considered that, since the permeation of the interacting polymer into the primer layer is suppressed in the acrylamide monomer as compared with the bifunctional acrylate monomer and the bifunctional methacrylate monomer, no abnormal deposition region is observed.

EXPLANATION OF REFERENCES

10: substrate
12: mesh-shaped plated layer
14: opening portion
20: substrate with plated layer having hemispherical shape
W: line width of fine line portion
L: length of one side of opening portion

What is claimed is:

1. A precursor film for producing a conductive film, the precursor film comprising:
   a substrate;
   a primer layer disposed on the substrate; and
   a plated layer precursor layer disposed on the primer layer,
   wherein the plated layer precursor layer includes a bifunctional radical-polymerizable monomer and a polymer having a functional group which interacts with a plating catalyst or a precursor of the plating catalyst, and
   the bifunctional radical-polymerizable monomer has 25 to 100 atoms in a main chain of a linking chain which links two radical-polymerizable groups.

2. The precursor film according to claim 1,
   wherein the radical-polymerizable group of the bifunctional radical-polymerizable monomer is a group selected from the group consisting of an acryloyloxy group, a methacryloyloxy group, an acrylamide group, and a methacrylamide group.

3. The precursor film according to claim 1,
   wherein the bifunctional radical-polymerizable monomer has a polyoxyalkylene group.

4. The precursor film according to claim 1,
   wherein the bifunctional radical-polymerizable monomer is a compound represented by Formula (100),

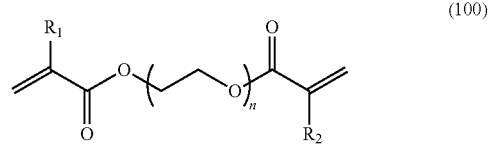

here, in Formula (100), $R_1$ and $R_2$ each independently represent a hydrogen atom or a methyl group, and n represents an integer of 9 to 33.

5. The precursor film according to claim 1,
   wherein the polymer having a functional group which interacts with a plating catalyst or a precursor of the plating catalyst is a polymer having a repeating unit derived from a conjugated diene compound, and a repeating unit derived from an unsaturated carboxylic acid or a derivative of the unsaturated carboxylic acid.

6. The precursor film according to claim 1,
   wherein the polymer having a functional group which interacts with a plating catalyst or a precursor of the plating catalyst is a butadiene-maleic acid copolymer.

7. The precursor film according to claim 1,
   wherein a glass transition temperature of the substrate is 100° C. or lower.

8. The precursor film according to claim 1,
   wherein the substrate is any one kind selected from the group consisting of a polypropylene-based resin substrate, a polymethyl methacrylate-based resin substrate, and a polyethylene terephthalate-based resin substrate.

9. A substrate with a plated layer comprising:
   a plated layer obtained by curing the plated layer precursor layer in the precursor film according to claim 1.

10. The substrate with a plated layer according to claim 9, wherein the plated layer is disposed in a pattern shape.

11. The substrate with a plated layer according to claim 9, wherein the substrate has a three-dimensional shape.

12. A conductive film comprising:
the substrate with a plated layer according to claim 9; and
a metal layer disposed on the plated layer in the substrate with a plated layer.

13. A touch panel sensor comprising:
the conductive film according to claim 12.

14. A touch panel comprising:
the touch panel sensor according to claim 13.

15. A method for producing a conductive film, the method comprising:
an exposing step of exposing the precursor film according to claim 1 to light;
a developing step of developing the exposed film;
a molding step of heat-molding the developed film; and
a plating step of plating the molded film.

16. The method for producing a conductive film according to claim 15,
wherein, in the molding step, the heat molding is performed at 60° C. to 120° C.

17. The method for producing a conductive film according to claim 15,
wherein, in the developing step, the exposed precursor film is washed with an alkaline aqueous solution and then washed with water.

18. A composition for forming a plated layer, the composition comprising:
a bifunctional radical-polymerizable monomer; and
a polymer having a functional group which interacts with a plating catalyst or a precursor of the plating catalyst,
wherein the bifunctional radical-polymerizable monomer has 25 to 100 atoms in a main chain of a linking chain which links two radical-polymerizable groups.

19. The composition for forming a plated layer according to claim 18,
wherein the radical-polymerizable group of the bifunctional radical-polymerizable monomer is a group selected from the group consisting of an acryloyloxy group, a methacryloyloxy group, an acrylamide group, and a methacrylamide group.

20. The composition for forming a plated layer according to claim 18,
wherein the bifunctional radical-polymerizable monomer has a polyoxyalkylene group.

21. The composition for forming a plated layer according to claim 18,
wherein the bifunctional radical-polymerizable monomer is a compound represented by Formula (100),

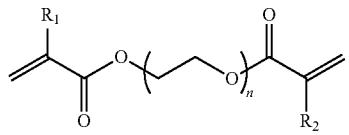

(100)

here, in Formula (100), $R_1$ and $R_2$ each independently represent a hydrogen atom or a methyl group, and n represents an integer of 9 to 33.

22. The composition for forming a plated layer according to claim 18,
wherein the polymer having a functional group which interacts with a plating catalyst or a precursor of the plating catalyst is a polymer having a repeating unit derived from a conjugated diene compound, and a repeating unit derived from an unsaturated carboxylic acid or a derivative of the unsaturated carboxylic acid.

23. The composition for forming a plated layer according to claim 18,
wherein the polymer having a functional group which interacts with a plating catalyst or a precursor of the plating catalyst is a butadiene-maleic acid copolymer.

\* \* \* \* \*